July 7, 1964 F. J. NAGEL 3,140,195
PROCESS FOR PROVIDING A COATED SURFACE
Filed July 18, 1958

INVENTOR
FRITZ J. NAGEL

BY
ATTORNEYS

United States Patent Office 3,140,195
Patented July 7, 1964

3,140,195
PROCESS FOR PROVIDING A COATED SURFACE
Fritz J. Nagel, Reiffton, Reading, Pa., assignor to The Polymer Corporation, a corporation of Pennsylvania
Filed July 18, 1958, Ser. No. 749,419
6 Claims. (Cl. 117—21)

This invention relates to processes for the application of multiple layer coatings on articles.

The present improvements are specifically directed to methods of applying to surfaces of articles, multi-layered protective coatings having special functions or properties resulting from the combination of properties of each layer, whereby the composite coating exhibits over-all qualities such as would not satisfactorily be obtained by the application of a single layer coating.

Heretofore the production of high quality commercial finishes such as those on automobiles and electrical appliances involved spraying of a number of coats of a resinous-based composition in a solvent solution upon the prepared surface with special spray guns and using booths or chambers with controlled atmospheres followed by subsequent drying of each coat in heated ovens or tunnels under banks of lamps. Such coatings usually include at least three and frequently many more layers, the ingredients of the spray mixture for each step being formulated to obtain the desired adhesion, filling, and surface smoothing effects. In applying the aforesaid coatings according to the prior art, an undue delay is caused by the relatively lengthy drying and baking procedures which are required after spraying each layer, in order to expel gaseous products such as solvents and/or dispersing liquids used in applying the coatings, the removal of volatiles being desirable to avoid the formation of bubbles and non-coherent or soft areas in the coating.

Moreover, using solvent techniques, there is a tendency of the solvent in each subsequent coat to have an adverse effect upon layers which have been applied previously. In other words, the solvent tends to redissolve portions of the undercoat, and it is for this additional reason that each coat must be baked before the next coat is applied.

The present invention avoids the delays attending the baking-drying steps of the prior art spray or dip-finishing procedures and improves on the versatility and latitude of coating properties including thickness, optical effects, and toughness, and effects economies through the use of simple equipment and the avoidance of loss of solvents.

It is accordingly an object of this invention to provide a method for applying a composite coating wherein each layer is deposited separately upon an article, the outer or finish coat being a thermoplastic or thermosetting material resistant to attack by solvents, chemicals, weathering or other adverse conditions.

Another object is to provide a method of improving the adhesion of coatings to the surfaces that they cover.

It is another object of the invention to provide a method of applying a multiplicity of coatings to an object, each of the coatings exhibiting a certain effect and the combination of the coatings providing a result which cannot be obtained by a single coating.

Still another object of the invention is to apply a multiplicity of coatings to an article and include therein certain other solid components or elements that are insoluble and provide certain visual or functional effects.

For certain types of decorative effects, it has proved desirable to apply cotton flock or the like, or random metallic particles to the surface of conventional liquid organic finishes. This has been done by using a special spray gun which deposits the material on the surface of the wet coating. Upon subsequent air drying or baking of the coating, the flock or metallic particles adhere to the surface. Such adherence is usually only fair because the necessary release of solvents from the organic coating film interferes with and detracts from the adhesion between the coating and the flock or metallic particles. Hence, another object of the invention is to apply cotton flock, metallic particles or the like to a coating in a better way.

The foregoing and other objects and advantages of the invention are realized according to the process of the present invention by employing a sequence of applications of coating materials wherein successive layers are deposited on a heated article from separate fluidized beds of dry solid pulverulent coating materials, each bed having been compounded according to the properties desired of the individual layer. The type of fluidized bed that is used is described in the British patent specification No. 759,214, published October 17, 1956.

In carrying the invention into effect, different dried pulverulent coating materials are placed in a series of fluidized beds and the article upon which the coating is to be deposited is heated and is immersed for predetermined periods of time in each fluidized bed in turn, thereby to apply a corresponding number of layers of coatings. In some instances the adjacent layers may interlace rather completely so that definite demarcation zones or intermediate composite layers are not readily distinguishable. Alternatively, a series of base layers may be built up with good fusion bonds therebetween while an outer layer or layers may be adhered to the base as separate films retaining a homogeneous character substantially throughout their thickness, as for instance in achieving desired visual and optical effects.

The article may again be heated prior to certain ones or prior to all of the successive dips, and the final layer may be subjected to a brief post-heating operation after solidification of the underlying layer so as to melt and smooth the outer surface with a minimum disturbance of the deeper layers. Where thermosetting coating formulations are employed, it is usually necessary to complete their curing by means of a post-heating step.

The invention includes within its scope applying by means of a fluidized bed a coating to an article that has already been coated by the fluidized bed technique, the coating material in the second fluidized bed having a different composition from the prior coating on the article. The desirable properties may, for example, be provided with a composite coating comprising a base coat and a finishing layer of dissimilar compositions, and which may also include one or more intermediate layers, the material of each layer being chosen for its specific contribution of physical properties and its compatibility with adjacent layers and/or environments.

The pulverulent coating materials of the two fluidized beds may be high melting high molecular weight organic polymeric thermoplastic resins such as polyethylene and linear polyamides generally referred to as nylons. Nylons that are particularly useful are polyhexamethylene adipamide, polyhexamethylene sebacamide and the polymeric caprolactams such as the polymers of epsilon caprolactam. Among other coating materials which are suitable for the present purposes are most of the thermoplastic resins or those having a thermoplastic phase and those which have a short time deterioration temperature which is sufficiently removed from the melting temperature thereof to permit the materials to be applied to the article to be coated by melting. Specific examples of additional materials useful for this purpose are polystyrenes, acrylic resins, bitumens such as gilsonite or asphalt, shellac and wax. Still other materials include cellulose acetate, propionate or butyrate, or mixed esters in this class.

One embodiment of the invention is directed to the formation of a layer of material on a primed surface of an article, the primer being an organic plastic material having the capacity to improve the adhesion between the surface of the base article and the finish coat. The primer may be applied by utilizing a pulverulent primer and immersing the article while heated into a fluidized bed thereof, or the primer may be applied as a liquid or as a solution in a suitable solvent.

The primer for a thermoplastic resin coating may be an uncured thermosetting resin. However, it is preferably a two-component resin system comprising an uncured thermosetting resin and a thermoplastic resin of the same chemical type as the coating, preferably dissolved in a solvent in which both are soluble. By the same chemical type is meant the relationship existing between two polymers of different degree of polymerization, or two cellulose esters having a different degree of esterification, or two copolymers having a different ratio of monomers, etc. The term "same chemical type" also applies to the relation between a cured and an uncured resin. It is desirable that the primer contains a large enough amount of the thermosetting resin (i.e., at least about 5 percent based on the two solid components) to provide an adequate bond with the surface, and a large enough amount of the thermoplastic resin (also at least about 5 percent) to provide a good bond to the superjacent coating.

The relationship between the primer and the final coatings which enables them to adhere to one another is undoubtedly a complex one depending upon such variables as the degree of cure of the primer (in case a thermosetting primer is used) at the time of immersion in the fluidized bed and the degree of compatibility between the resin in the primer and the resin of the final coating, etc. It is generally considered desirable to deposit the final coating on the primed surface before the resin is fully cured. Although defining or controlling the degree of drying or curing of the primer coat does not lend itself to a precise treatment or precise measurement, in practice drying of the primer is carried out by simple exposure to the air at ambient room temperatures. Generally the degree of drying that is desired may be controlled approximately by testing the tackiness of the primed surface, the object being to immerse the primed surface in the fluidized bed of finish coating material while the primed surface has some degree of tackiness.

There may be chosen for a primer coat upon a prepared metal surface, a thermosetting resin such as a phenolic resin having excellent adherence, including desired fillers or coloring matter, followed by a tough flexible glossy plasticized cellulose ester such as cellulose acetate-butyrate resin including desired pigment colors, metal particles or fillers thereby to provide a durable protective and decorative composite finish. The primer layer may comprise a phenolic resin, and the outer surface or finish coat may be thermoplastic material resistant to attack by solvents and chemicals as exemplified by polyhexamethylene adipamide (nylon).

The thermosetting type of primer may be advantageously used in preparing the surface for a coating of a thermosetting resin. This may be done by applying to the clean surface of the article a solution of an at least partially uncured thermosetting resin in a solvent, the primer being of the same chemical type as the thermosetting coating material, removing the solvent from the primer, leaving a layer of primer on the surface, and thereafter immersing the heated article in the fluidized bed of the thermosetting coating material. An example of such an operation is using an at least partially uncured epoxy resin in a solvent to prime the surface of a metal article and thereafter immersing the heated article in a fluidized bed of the uncured epoxy resin containing a curing agent.

One of the layers below the finish coat may contain a solid lubricant of non-melting inorganic particles embedded therein such as molybdenum disulfide or other metallic disulfide or graphite. Such particles may be embedded in or adhered to the surface of such layer. The outer layer then will be applied so as not to cover all of the solid lubricant particles but leave portions of them exposed to exert their lubricating action.

Instead of incorporating solid lubricant particles in the manner just described, the particles bonded by the two layers may be abrasive, friction increasing or otherwise surface modifying organic or inorganic materials such as alumina, silica, magnesia, or silicon carbide.

In still other embodiments of the invention glass articles may be coated with a tough transparent substance such as cellulose acetate-butyrate and a second layer having resistance to solvents and to attack by chemicals and/or gases such as a chlorinated polyether to fulfill the objects set forth above.

The invention including the objects and advantages stated above and others may be understood from the following description as read in conjunction with the accompanying figures of the drawings.

FIG. 1 shows in cross-section a tank for fluidized coating material, one such tank being required for each different layer-forming material in the practice of the invention;

Figure 2:
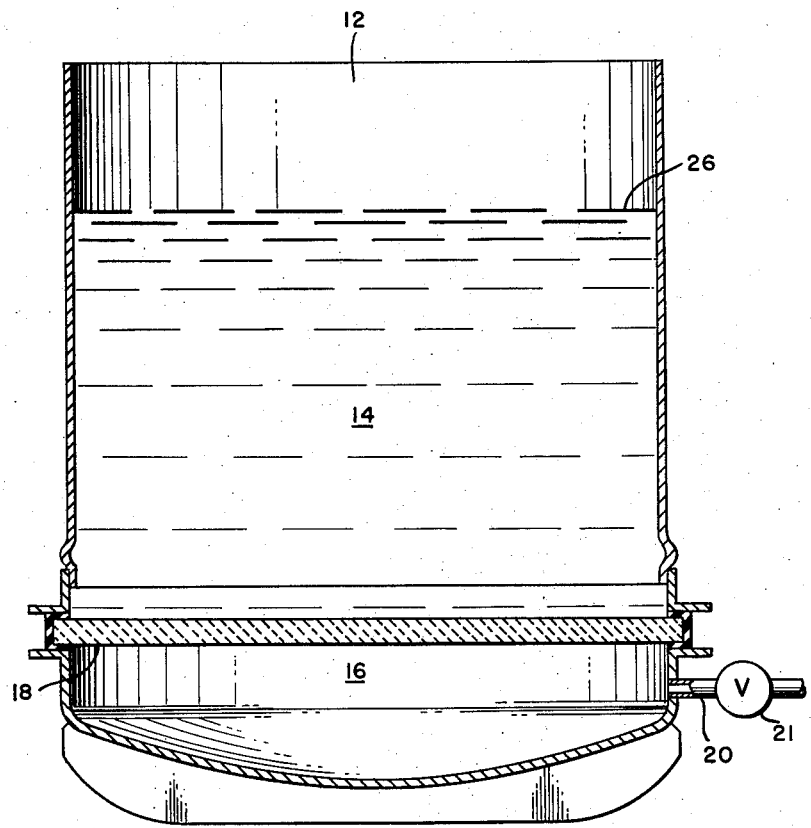
FIG. 2 is an enlarged cross-sectional view of an article having a multi-layered coating comprising lubricant particles.

There is illustrated in FIG. 1 an apparatus 10 for carrying out the process of the present invention. It generally includes an open top container 12 of suitable cross-section which is horizontally divided into upper and lower chambers 14 and 16, respectively, by means of a porous partition 18. The partition, which should be pervious to the gas but impervious to the particles of coating material, may preferably take the form of a porous, ceramic plate although other similar structures may be advantageously used. The porous plate preferably has an average pore diameter in the range from 0.003 to 0.004 of an inch, or less.

The pulverulent coating material is placed on the upper surface of the partition so that the articles to be coated can be at least partially immersed therein. Thereafter, gas under pressure, as for example air or nitrogen, is blown into the lower chamber of the container through the pipe 20 and the valve 21 and penetrates through the porous partition into the powder causing the powder to be converted into a continuously fluidized bed. When fluidized, the individual particles become separated from one another and the bed of coating material appears to expand to occupy a greater volume and the upper surface of the mass of coating material 26 therefore rises to an equilibrium level within the container.

The practices and purposes of the invention may be appreciated by a study of the following examples which are given only by way of illustration and are not intended in any way to be limiting of the scope of the invention as defined in the appended claims.

*Example 1*

An aluminum plate was subjected to sandblasting to produce a dull cleaned metal surface and was immersed after having been heated uniformly to 300° F. in a fluidized bed of a filled epoxy resin powder having a particle size passing 70 mesh screen. After a dip time of between three and five seconds the body was removed from the bed and was immediately transferred without unnecessary delay to a second bed of epoxy clear resin of the same particle size and basic formulation, in which fluidized coating bed the plate was immersed for between three to five seconds. A cure for 15 minutes was effected by placing the plate in a constant temperature oven held at 300° F. The constituents of the first coating bed were a prepared mixture of two base resins each having epoxide equivalent values of the order of 200 and above. Resin No. 1 was a viscous liquid at room temperature having a specific gravity of 1.23 and having an epoxide content of 1 gram equivalent for 190–210 grams of resin; its melting point was between 8 and 12° C., and the resin had an equivalent weight defined in that 80 grams of resin are completely esterified by 60 grams of acetic acid. Resin No. 2 comprised a solid epoxy material having a specific gravity of 1.21, and an epoxide equivalent defined as one gram equivalent of epoxide being present in 450–525 grams of resin; the equivalent weight of the resin was defined as 130 grams of resin required to completely esterify 60 grams of acetic acid. The melting point of Resin No. 2 was in the range 64–76° C.

The two resins were blended in a sigma-arm mixer, and a curing agent, a modified meta-phenylene diamine was added. The material was allowed to set to a slab for a period of 14 hours at room temperature, and thereafter was processed by grinding in the cold in inert environment to pass all particles through a 50-mesh sieve. The ground powder mixture was then divided into two parts, to the first of which there was added 6% by weight of a bronze particulate metal in large flat platelet particle form, and 2% by weight of a smaller flake bronze pigment. The metal particles were dry blended with the epoxy resin powder, to provide the filling for the fluidized bed by means of which the first layer of coating was applied.

A second portion of the prepared powder was left unfilled and was used for the application of the clear surface layer.

The resulting film comprising the base coat and the clear layer had a total thickness measuring between 15 and 20 mils and was observed to adhere satisfactorily to the plate. The strength of the coating was excellent and the surface was hard, glossy, and smooth. The larger flakes of pigment were noted to have remained bright and were embedded in the base epoxy resin layer at all angles throughout the thickness of the first coat, which behavior is attributed largely to the high viscosity of the epoxy medium in which the particles were suspended. A pronounced three-dimensional effect was observed due to the reflection of light from these particles at all angles and from all levels of the lower layer of the composite coating.

*Example 2*

A steel shaft having a diameter of ¾ inch and a length of seven inches was pre-heated to a temperature of 650° F. A fluidized bed was prepared with a formulation of polymerized polyhexamethylene adipamide, and the shaft immersed for seven seconds. The shaft was immediately immersed in an air fluidized bed of molybdenum disulfide dust of a particle size passing 200 mesh screen. The excess non-adherent dust was then stripped by a jet of air, and the shaft was then immersed in a fluidized bed of polyvinyl acetate having an intrinsic viscosity in cyclohexanone of 0.56 at 20° C. and a particle size ranging from 0.001 to 0.005 inch. The dip time was made very brief, of the order of 1½ seconds, and immediately on withdrawal excess powder was shaken off. The shaft was cooled in still air, during which cooling the polyvinyl acetate film was observed to flow out somewhat and to form a discontinuous film entraining the molybdenum disulfide and exposing numerous discrete uncovered areas of the lubricant. The character of the deposit is shown in FIG. 2 in which the nylon layer is shown at 25, the molybdenum disulfide at 26', the polyvinyl acetate at 27, and the steel shaft at 28.

*Example 3*

An aluminum rod measuring 0.5 inch diameter by 6 inches long was heated to a temperature of 625° F. and then dipped into a fluidized bed of plasticized, heat-stabilized cellulose acetate butyrate resin in particulate form, the size ranging from 0.003 to 0.011 inch, for a period of six seconds. The rod was then held free of the bed for about eight seconds to promote the flow of the plastic layer by residual heat outflow, and was then dipped into a fluidized aluminum powder pigment. The time of immersion was three seconds or less, after which the rod was immediately dipped for between three to five seconds in a bed of clear epoxy resin prepared as in Example 1. The epoxy coating was baked at 300° F. for 15 minutes to effect a cure. When cooled, the resultant coating was observed to have a brilliant silvered effect overlaid by a glossy smooth film, a thickness of about 20 mils, and excellent strength. The character of the deposit is shown by the cross section in FIG. 3, in which the cellulose acetate butyrate is shown at 30, the aluminum flake at 31, the epoxy resin at 32 and the rod at 33.

*Example 4*

An aluminum open box-like body having dimensions 3¼ inches wide by 6 inches long by 2½ inches high and an average wall thickness of 0.132 inch, was cleaned and scoured by sandblasting, and then uniformly heated to 320° F. A first very thin coat was applied by dipping for two seconds with agitation in a fluidized bed of epoxy clear resin was prepared by the method of Example 1. It was then allowed to flow out while the box was held free of the bed for a period of 12 seconds, after which the box was dipped four seconds with agitation into a fluidized bed of zinc chromate powder having particle size of 200 mesh. Excess of the powder was stripped by blowing blasts of air against the surfaces and a cure was carried out at 300° F. in an oven for 15 minutes. The temperature was then raised to 450° F. after which the box was dipped a second time in a bed of cellulose acetate butyrate resin having particle sizes ranging from 0.001 to 0.005 inch, for a period of eight seconds. The body was then postheated at 450° F.

The resultant coating measured about 24 mils thick and was observed to be smooth and continuous, exhibiting a glossy surface. The coating had a structure similar to that shown in FIG. 3 wherein the reference numbers now refer to the materials used in the present examples. Other cellulose esters of acetic, propionic or butyric acid may be used instead of the acetate-butyrate.

*Example 5*

An aluminum test rod measuring 2½ inches long by ½ inch diameter was sandblasted over all of its surface and preheated to a temperature of 485° F. The rod was immersed for three seconds in a fluidized bed of plasticized cellulose acetate butyrate resin in particle size ranging from 0.003 to 0.018 inch. The deposit was allowed to smooth in air by residual heat outflow for approximately 15 seconds. It was then immersed without further heating in a fluidized bed of aluminum powder having a particle size passing 75 mesh screen and none smaller than 200 mesh, for about three seconds. The rod was immediately dipped for about two seconds into a fluidized bed of plasticized heat-stabilized cellulose acetate butyrate. The surface of the coating was smoothed by post-heating for 30 seconds in an oven at 520° F.

Figure 3:
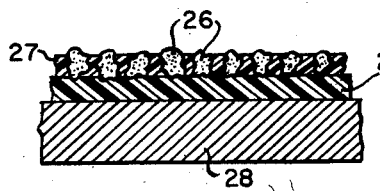
FIG. 3 shows an article coated with three layers comprising a metal flake.

A finish was obtained having a bright, glossy smooth surface, free from pinholes. The aluminum powder showed through as a dull metal matte-like background. The structure of the resulting coating is illustrated in FIG. 3, wherein the reference numbers now refer to the materials used in this example.

*Example 6*

An aluminum plate measuring ¼ inch thick by 4 inches by 7 inches was cleaned and scoured by sandblasting, then heated to 650° F. It was then dipped into a fluidized powder bed comprised of polyhexamethylene adipamide plastic in particle sizes ranging from .001 to 0.15 inch, for a period of about four seconds. The coated rod was then dipped into a fluidized bed of molybdenum disulphide powder passing 75 mesh screen. After shaking off the unadhered particles of the lubricant by tapping an edge, the rod was immediately dipped for about ½ to 1 second in the bed from which the first coat was applied.

On cooling the resulting composite film was observed to have a surface with many pinhole areas exposing isolated patches of molybdenum disulfide. The structure is illustrated by FIG. 2, except that the reference numbers refer to the materials of the present example.

In addition to the foregoing examples, the invention may be used in coating various types of glass articles, woven textiles, etc. Although specific embodiments of the invention have been described it will be apparent that there are many modifications within the scope of the above teachings and it is intended to include all such modifications and equivalents within the claims.

I claim:

1. The process of producing a coating upon the surface of a body which comprises the steps of forming a fluidized bed of coating material in pulverulent form containing particles therein which fuse when heated, heating the body above the fusion temperature of said fusible particles and immersing the body in the dense phase of the fluidized bed, withdrawing the body from the bed, applying infusible particles to the first coating while it is heated to a temperature at which the first coating is tacky so that a coating of said infusible particles is formed on the first coating, and thereafter immersing the body in a fluidized bed of coating material in pulverulent form containing particles therein which fuse when heated thereby to form a layer covering substantial portions of said infusible particles.

2. The process of claim 1 wherein said infusible particles are abrasive.

3. The process of claim 1 wherein the infusible particles are applied by forming a fluidized bed of said particles and immersing the body therein.

4. The process of claim 1 wherein said infusible particles are of a solid lubricant.

5. The process of claim 4 wherein said solid lubricant is molybdenum disulfide.

6. The process of claim 4 wherein said solid lubricant is graphite.

References Cited in the file of this patent

UNITED STATES PATENTS

| | | |
|---|---|---|
| 2,060,928 | Damitz | Nov. 17, 1936 |
| 2,123,537 | Marr | July 12, 1938 |
| 2,199,597 | Renfrew et al. | May 7, 1940 |
| 2,550,232 | Donnell et al. | Apr. 24, 1951 |
| 2,681,473 | Carlson | June 22, 1954 |
| 2,825,706 | Sanders | Mar. 4, 1958 |
| 2,842,459 | Gollub et al. | July 8, 1958 |
| 2,844,489 | Gemmer | July 22, 1958 |
| 2,861,007 | Hazeltine | Nov. 18, 1958 |
| 2,864,722 | Millar et al. | Dec. 16, 1958 |